(12) United States Patent
Banfield

(10) Patent No.: US 9,521,837 B2
(45) Date of Patent: Dec. 20, 2016

(54) INSECT TRAP

(71) Applicant: Michael Gilbert Banfield, Woodinville, WA (US)

(72) Inventor: Michael Gilbert Banfield, Woodinville, WA (US)

(73) Assignee: SpringStar Inc., Woodinville, WA (US)

( * ) Notice: Subject to any disclaimer, the term of this patent is extended or adjusted under 35 U.S.C. 154(b) by 130 days.

(21) Appl. No.: 14/477,065

(22) Filed: Sep. 4, 2014

(65) Prior Publication Data

US 2016/0066556 A1    Mar. 10, 2016

(51) Int. Cl.
*A01M 1/14* (2006.01)
*A01M 1/10* (2006.01)

(52) U.S. Cl.
CPC ............. *A01M 1/145* (2013.01); *A01M 1/106* (2013.01)

(58) Field of Classification Search
CPC .............................. A01M 1/145; A01M 1/106
See application file for complete search history.

(56) References Cited

U.S. PATENT DOCUMENTS

| | | | | |
|---|---|---|---|---|
| 5,022,179 A * | 6/1991 | Olson | ..................... | A01M 1/14 43/114 |
| 5,649,385 A * | 7/1997 | Acevedo | ................. | A01M 1/14 43/114 |
| 5,713,153 A * | 2/1998 | Cook | ..................... | A01M 1/14 43/114 |
| 7,380,369 B1 * | 6/2008 | Greene | ................. | A01M 1/023 43/107 |
| 2010/0088948 A1 * | 4/2010 | Yeh | ........................ | A01M 1/145 43/113 |
| 2010/0154290 A1 * | 6/2010 | Fisher | ..................... | A01M 1/02 43/114 |
| 2014/0007488 A1 * | 1/2014 | Calabrese | ............... | A01M 1/16 43/115 |
| 2014/0223803 A1 * | 8/2014 | Hariyama | ............... | A01M 1/04 43/107 |

\* cited by examiner

*Primary Examiner* — Gary Hoge

(57) ABSTRACT

An insect trap for multiple species of pest insects, especially flying insects that are an indoor nuisance. The trap contains at least two parallel, planar, transparent faces, each face configured to polarize transmitted light into a single plane. The faces are oriented such that the light polarization planes are at substantially right angles. When the trap is attached substantially flush to a window, phototactic insects against the window perceive the trap faces as transparent and are thus induced to crawl in to the trap. However, light is prevented from passing through both faces, substantially obscuring the view of trapped insects inside to a casual human observer.

19 Claims, 3 Drawing Sheets

INSECT TRAP

BACKGROUND OF THE INVENTION

A common indoor problem is undesired insects, such as Asian lady bugs, houseflies, flies, fruit flies, gnats, stink bugs, and the like. Undesired insects may cause contamination of food, allergic reactions in humans, and general annoyance. Many procedures and devices have been produced to capture or remove such undesired insects from within households, store, restaurants, and other indoor areas. However, insects that are caught in such traps (e.g. adhesives that are hung from ceilings to capture a passing insect) are in full view, which may be undesirable.

It is known in the art that many insects, including domestic pests such as house flies, are attracted to light sources. In the case of house flies, the insects often end up congregating at the strongest light source, i.e. exterior-facing windows. Prior inventions have attempted to capitalize on this fact, such as adhesive devices that are placed on windows. However, insects caught on such adhesives are in full view, which may be aesthetically unpleasant and undesirable. Some insects traps have been designed to have a box or decorative element that surrounds the insect trapping means to keep captured insects out of view, but this box or decorative element also decreases the amount of light surrounding the insect trapping means, potentially decreasing the attraction of the insect towards the insect trapping area and decreasing the effectiveness of the trap. Some other insect traps have been designed to include a light source which attracts insects towards an insect trap, but this increases the size, cost, and complexity of the insect trap.

The prior art teaches the use of at least two orthogonally-rotated polarizing filters to control the passage of light through both windows and thus obscure the view of objects located behind both filters. There is no prior art that teaches using polarized light to capture houseflies. It was discovered by the inventor that an object, such as the body of a housefly, which is located between two parallel, orthogonally-rotated, plane-polarizing light filters is substantially obscured from external view, a novel effect not taught or suggested by the prior art. Further experimentation demonstrated that a trap which is substantially transparent from an insect's plane-on point of view but which is opaque to a human's face-on point of view is superior to a trap which is opaque to both human and insect, which was an unexpected benefit from the method.

It is now apparent that the prior art lacks an insect trap that effectively utilizes ambient light to attract insects while substantially hiding captured insects from public view. This invention provides such an insect trap.

BRIEF SUMMARY OF THE INVENTION

One object of the present invention is to provide a device and method for trapping flies that overcomes problems not addressed by the prior art. Another object of the invention is to provide an insect trap that is inexpensive and easy to manufacture, is compact for efficient storage and shipping, is simple to use, utilizes ambient light as an attractant, and which can be disposed of once full without exposing the user to the insect capturing means or captured insects.

The invention described herein is a trap containing at least two parallel, planar, transparent faces, each face configured to polarize transmitted light into a single plane. The faces are oriented such that the light polarization planes are at right angles. When the trap is attached substantially flush to a window, positively phototactic insects upon the window perceive the trap faces as transparent and are thus induced to crawl in to the trap. However, light is prevented from passing through both faces, substantially obscuring the view of trapped insects inside to a casual human observer.

In the instant invention, the word "insect" is defined as it is used in the US Patent and Trademark Class Definition for Class 43 Subclass 107, that is, it is used to mean "not only true insects all of which are Hexapods, or six-legged, but creatures, often confounded with insects, belonging to the classes known as 'Arachnida' and 'Myriapoda', examples of the former class being scorpions, spiders, and mites and of the latter being centipedes and millipedes."

In the instant invention, the word "window" is broadly defined as a substantially transparent portion of a continuous face, which may encompass a portion up to 100% of said face. This definition includes the common definition of "window" that refers to a transparent structural feature within an otherwise opaque wall of a building or vehicle.

DETAILED DESCRIPTION OF THE INVENTION

The preferred embodiment of the invention as shown in the accompanying drawings will now be described in detail. The following description of the invention is not intended to limit the invention to these preferred embodiments, but rather to enable any person skilled in the art to make and use this invention.

Figure 1:
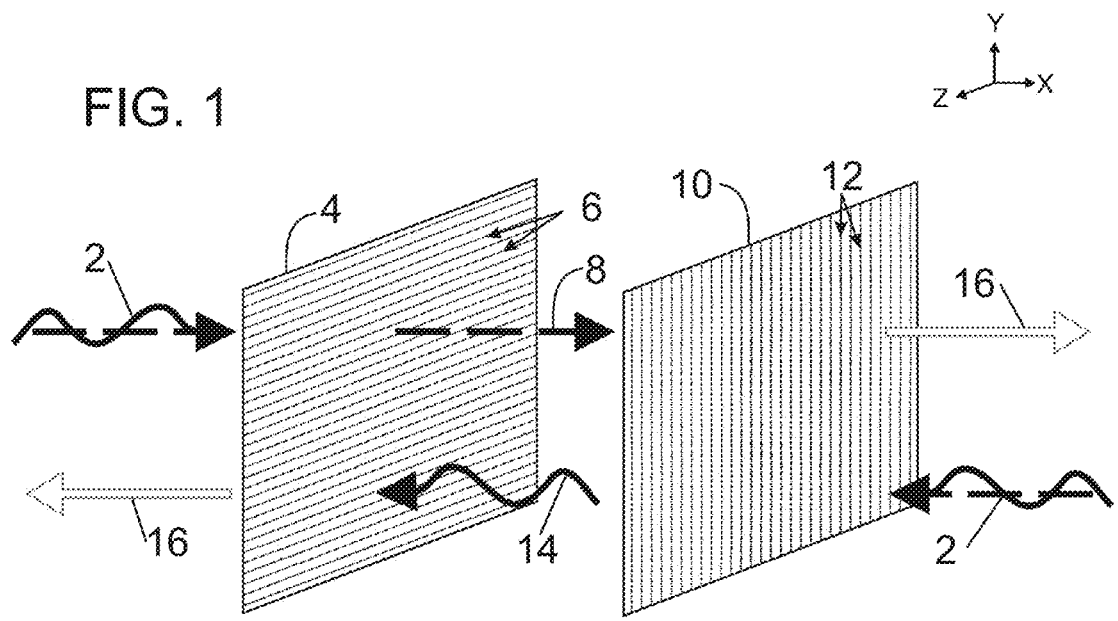
FIG. 1 depicts the propagation of light as it passes sequentially through two plane-polarizing windows which polarize light at 90° to each other.

It is well known how to polarize light such that it propagates in a single plane. FIG. 1 depicts the path of light waves as they pass through two opposing, orthogonally oriented polarizing filters. The light waves are depicted in a Cartesian coordinate system with an X-axis, Y-axis, and Z-axis. Waves of non-polarized light 2 incident on a first polarizing layer 4, which is configured to polarize light in a single plane (as depicted by parallel shading lines 6), are filtered such that only light waves propagating in an X-Z plane 8 are transmitted. A second polarizing layer 10, which is configured to polarize light in a single plane (as depicted by parallel shading lines 12), has been oriented 90 degrees offset to the first layer 4. When the X-Z polarized light waves 8 encounter the second polarizing layer 10, none of the X-Z polarized light waves 8 are permitted through, resulting in a substantially darkened region 16 where the two polarizing layers 4, 10 overlap. Conversely, waves of non-polarized light 2 incident on the second polarizing layer 10 are polarized into an X-Y plane 14 and are unable to pass through the first, X-Z polarizing layer 4 resulting in a substantially darkened region 16. In this and subsequent drawings, parallel shading lines on a face are used to represent the polarization angle of transmitted light waves.

Figure 2:
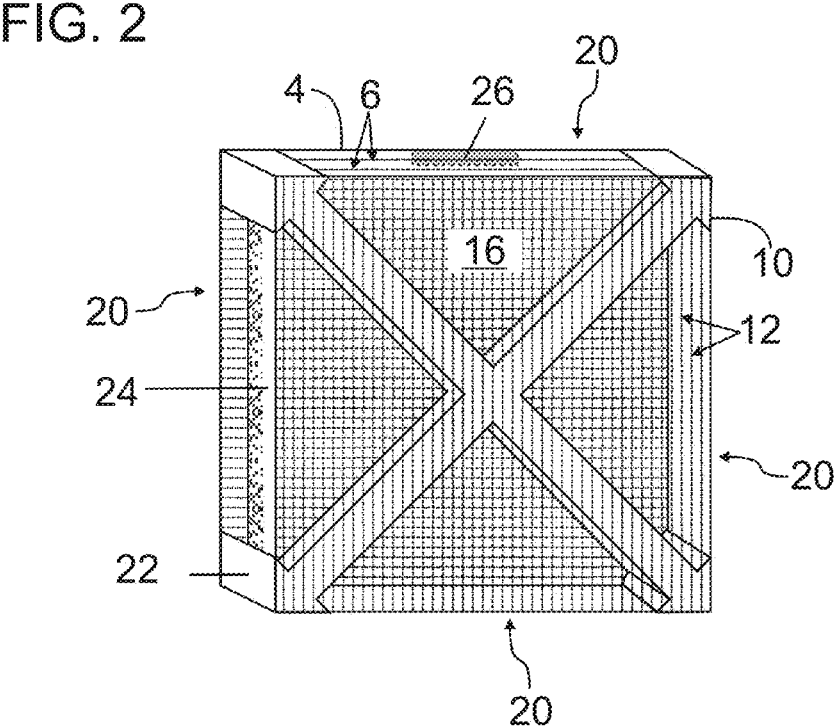
FIG. 2 depicts one embodiment of the insect trap of the invention, with internal spacing elements and a plurality of openings.

As shown in FIG. 2, one preferred embodiment of the insect trap includes a first light polarizing layer 4 configured to polarize light in a first specific plane 6, and a second light polarizing layer 10 configured to polarize light in a second specific plane 12, the second plane 12 being at substantially right angles to the first plane 6, resulting in a substantially obscured region 16 where the two faces overlap. The insect trap further includes a plurality of openings 20, created by an internal spacing element 22 that ensures that the two polarizing layers 4, 10 remain separated. The plurality of openings 20 allow insects to approaching the trap from multiple directions to enter and become ensnared by the insect trapping means 24. The insect trapping means 24 preferably traps common household insects including but not limited to Asian lady bugs, box elder bugs, brown marmorated stink bugs, cluster flies, cone bugs, filth flies, fruit flies, fungus gnats, house flies, June beetles, moths, yellow jackets, and wasps. The insect-trapping means 24 is preferably a pressure-sensitive adhesive that functions to trap insects as they pass within close proximity or land on the adhesive. The insect trapping means 24 may alternately include protrusions that snag onto a crawling, flying, or otherwise passing insect. The insect trapping means 24 is preferably translucent and/or transparent to allow light to come in through the wall that it is coupled to. The insect trapping means 24 may also include a colorant that tints the light passing through the adhesive to a more attractive color, or may also include an ultraviolet pigment, which may be more attractive to insects, thus luring the insect towards the insect trapping material 24. A securing means 26, in this embodiment a removable, pressure-sensitive adhesive, is employed to secure the insect trap to a substrate such as a window. The securing means 26 is preferably an adhesive that allows the container to sit flush against the substrate. Alternatively, the securing means 26 could be a hook, for example an "S" hook that hooks onto both the insect trap and a substrate such as a windowsill. The securing means 26 is preferably non-permanent, allowing relatively easy removal or replacement of the insect trap, for example when the user wishes to replace a used trap with a new trap. However, the securing means 26 may be of any other suitable type.

Figure 3:
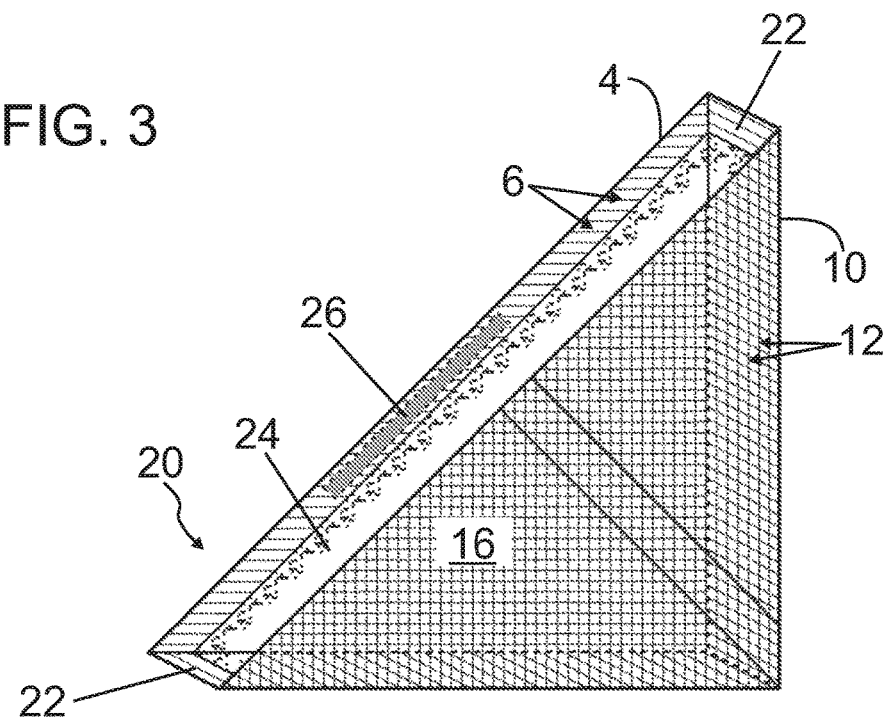
FIG. 3 depicts a second embodiment of the insect trap, with marginal spacing elements and a single opening, in folded configuration.

An alternate preferred embodiment of the insect trap is shown in FIG. 3. A first polarizing layer 4, configured to polarize light in a specific plane 6 and a second polarizing layer 10 configured to polarize light in a second specific plane 12 are oriented such that the two planes of light 6, 10 are at substantially right angles, resulting in a significantly obscured region 16 where the two polarizing layers 4, 10 overlap. The insect trap further includes a single opening 20 or space between the two layers whereby insects may enter the trap and become ensnared by the insect trapping means 24. In this embodiment, the insect trapping means 24 is a pressure-sensitive adhesive, coupled to the inside face of the polarizing layers 4, 10. The spacing element 22 is marginal to the two polarizing layers 4, 10, resulting in a single opening 20. A securing means 26 by which the insect trap may be secured to a substrate is also illustrated.

Figure 4:
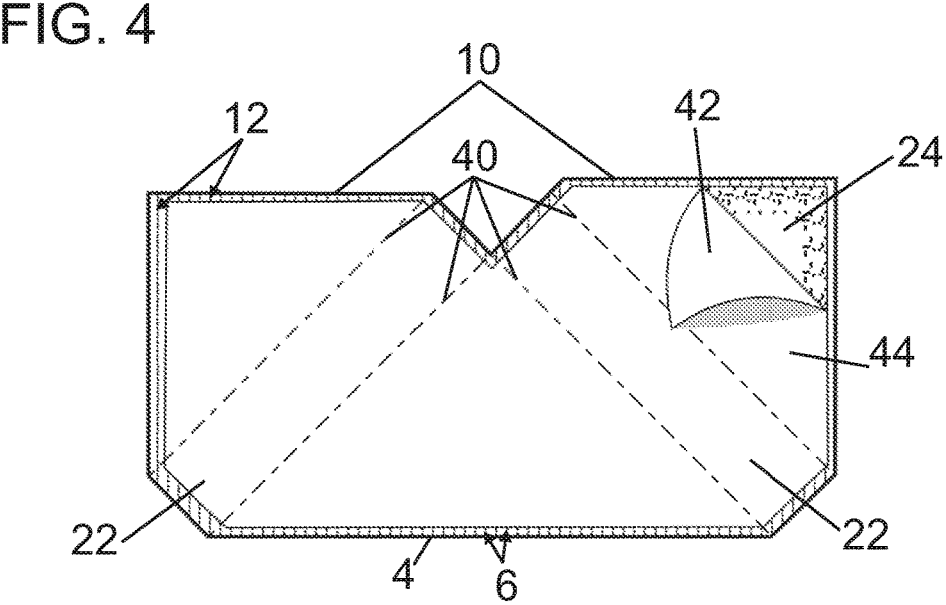
FIG. 4 depicts the second embodiment of the insect trap of the invention, in an unfolded configuration.

FIG. 4 depicts an unfolded configuration of the insect trap pictured in FIG. 3 which is constructed out of a single sheet of polarizing material. The sheet is preferably a material that is foldable but maintains a certain level of stiffness to maintain the shape of the container in the folded mode, for example, a thin sheet of polypropylene containing a polarizing means. The insect trap is cut out from a single sheet of polarizing material and scored along fold lines 40 as shown. An insect trapping means 24 such as an adhesive is applied to one side and is covered by a release paper 42 for ease of storage, transport, and handling. Once an individual (for example, a store merchant or the end user) decides to use the insect trap, the release paper 42 is removed. The sheet is then folded along the score lines 40 to form the insect trap as pictured in FIG. 3. The center of the original sheet becomes a first polarizing layer 4 which polarizes incident light in one plane 6, while the two distal segments join to form a second polarizing layer 10, subsequently polarizing incident light at a second plane 12 rotated 90° from the first plane 6. The two regions between the center segment and the distal segments are used as the spacing element 22 in this embodiment. The larger of the distal segments 44 may overlap the opposing distal segment in such a way that the insect trapping means 24 is also used to hold the segments together to form a continuous layer 10. Alternately, the sheet may include overlapping portions that are tabs which are inserted into slits to maintain the sheet in the folded mode. However, any other means or method may be used to maintain the sheet in the folded mode.

Figure 5:
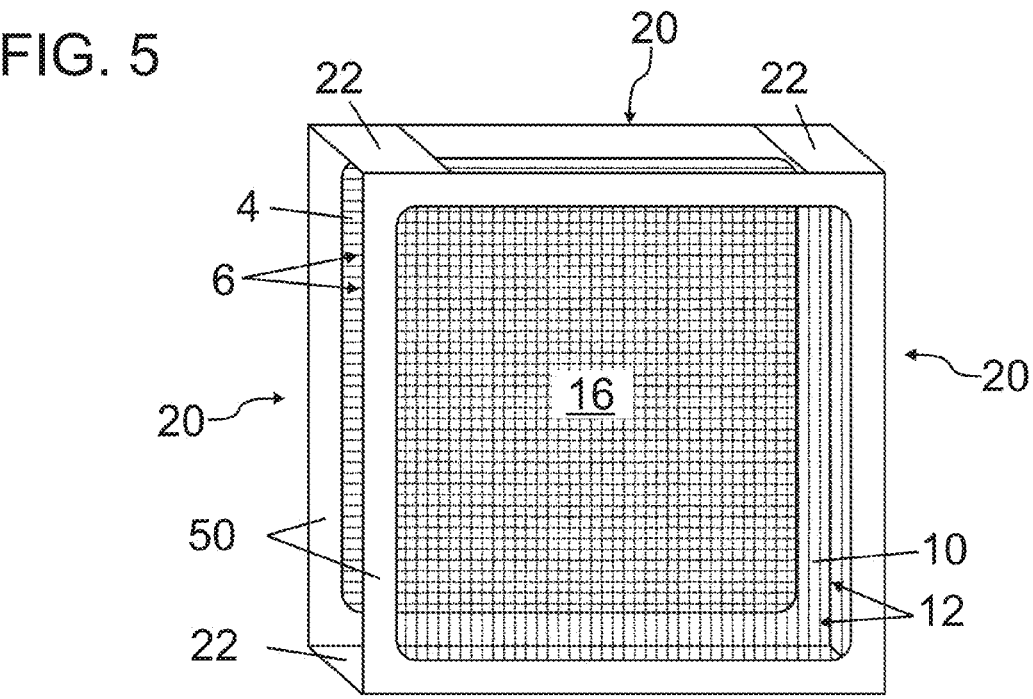
FIG. 5 depicts a third embodiment of the insect trap, with marginal spacing elements and a plurality of openings.

Another embodiment of the insect trap is shown in FIG. 5. The first polarizing layer 4, configured to polarize light in a first plane 6 is coupled to a frame 50. The second polarizing layer 10, which is configured to polarize light in a second plane 12 is also coupled to a frame 50. The two polarizing layers 4, 10 are held parallel by the spacing elements 22 in order to create a significantly obscured region 16 where the two layers 4, 10 overlap. In this embodiment, the spacing elements 22 are marginal, creating multiple openings 20. Optionally, at least one spacing element 20, depicted on the bottom in this figure, may extend the entire length of one side of the polarizing layers 4, 10, to allow for single-sheet assembly of the frames 50 and spacing elements 22. In one configuration, the interior surface of the polarizing layers 4, 10 are secured to exterior of the frames 50 by an adhesive which also serves as an insect trapping means. However, any appropriate means of assembly may be used. In another configuration, the exterior surface of the polarizing layers 4, 10 may be secured to the interior of the frames by any appropriate means, such as a hot melt adhesive. The insect trapping means would then be coated on the internal faces of the polarizing layers 4, 10 separately. The insect trap of this embodiment may be secured to a window by any appropriate means.

Figure 6:
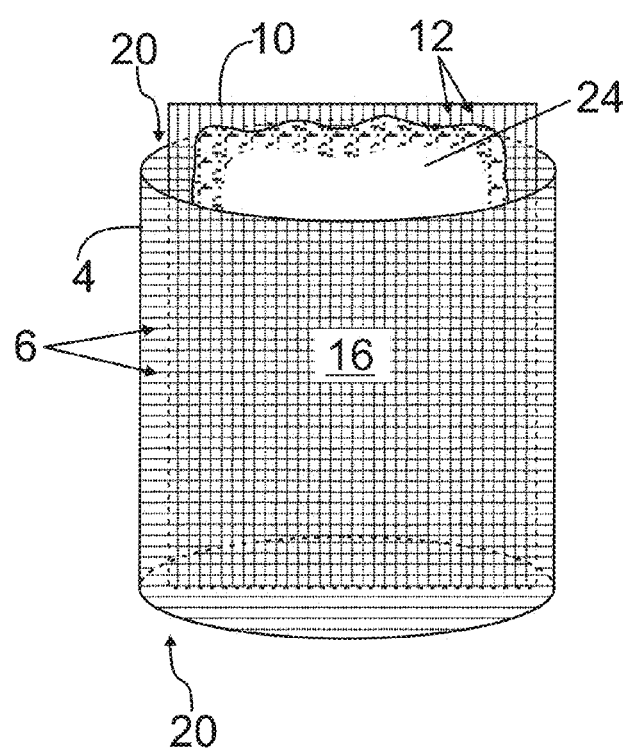
FIG. 6 depicts a cylindrical embodiment of the insect trap.

A fourth embodiment of the insect trap is shown in FIG. 6. In this embodiment, the first polarizing layer 4, configured to polarize light in a first plane 6 is formed in an open cylindrical shape. A second, flat polarizing layer 10, configured to polarize light in a second plane 12, can be inserted inside the cylindrical first polarizing layer 4 such that a substantially obscured region 16 is produced when it is viewed at an angle roughly perpendicular to the plane of the second polarizing layer 10. The second polarizing angle may be wide enough to fully bisect the openings 20 of the cylindrical first layer 110, but that is not necessary. An insect trapping means 24 such as a pressure sensitive adhesive may be applied on one or both sides of the flat second layer 10, as depicted. Optionally, the insect trapping means 24 may additionally be applied to the internal surface of the cylindrical first layer 4. A trap of this embodiment may additionally consist of a hanging element or a stand, which would allow it to be secured somewhere other than in a window, such as hanging from a ceiling tile, joist, or beam, or standing on a table or shelf.

It should be clear to one of average skill in the art that minor variations or additions to the preferred embodiment fall within the scope of the invention as presented. For example, the insect trap may include more than one pair of opposing polarizing filters. The opposing polarizing layers 4, 10, which are configured to polarize light in a specific plane, may be formed entirely from a polarizing material or may be formed from a polarizing material layered on the exterior of another, optically neutral, substantially transparent material including but not limited to glass, polycarbonate, polypropylene, polyethylene, or other suitable polymeric materials. An example of such a polarizing material is produced by Sanritz Corporation of Japan, where 99.9% of light that passes through a first polarizing layer and then to a second polarizing layer oriented at a 90 degree offset from the first polarizing layer is blocked. However, any other suitable type of polarizing material may be used. The insect trap may be composed of a flexible material, alternately it may be composed of a rigid material that is formed in the shaped of the container, for example, a molded plastic or formed glass. However, the insect trap may be formed using any other suitable material or means. In another variation, the insect trapping means 24 may be incorporated into a separate removable element to allow for reuse of the insect trap body. The insect trapping means 24 may be something besides an adhesive; for example, the insect trap of FIG. 3 could be rotated 45° clockwise from the portrayed position and filled with a liquid trapping medium such as soapy water. Or the insect trapping means 24 may be simply the shape of the entrance holes 20; Donahue (U.S. Pat. No. 5,392,560) for example, teaches using conical entrance holes to prevent insect exit from the trapping region of an insect trap. Another possible variation is to add color or patterns to the insect trapping means in order to more narrowly target attractiveness to a single species of insect. The insect trapping means 24 may also include a lure material, for example a pheromone that attracts insects, to further lure insects or alternately to lure only specific insects into the insect trap.

Without limiting the scope of the invention as outlined in the claims, this section illustrates the primary features of the best mode of the invention for better understanding by the reader and to enable anyone skilled in the art to make and use this invention. However it will be readily apparent to anyone skilled in the art that omissions, modifications, substitutions, and changes in the form or details of the device, its appearance, or its operation may be made without departing from the spirit and scope of the invention. This section has provided examples of variant embodiments which may be employed that fall within the spirit and scope of the claims. Accordingly, the invention should not be limited by the details herein illustrated.

EXAMPLE I

Prototypes of the embodiment depicted in FIG. 3 were compared to a commercially available trap of similar shape (Fly Motel® Window Trap, Black Flag Brands LLC, New York Mills, N.Y.; also described in Acevedo U.S. Pat. No. 5,649,385) in a replicated cage bioassay. Two traps of each type were placed in a 25 cm wide×25 cm high×75 cm long acrylic box with a screen on one end. All traps were secured in a bottom corner of a long wall, with the trap opening facing towards the center of the box. Similar traps were placed in opposing corners to minimize possible positional effects due to minor variations in external light. Two replicate cages were set up. Approximately 75 flies (*Musca domestica*, Rincon-Vitova Insectaries, Ventura, Calif.), 1-2 days old and mixed sexes, were released into each cage every day for three days. Traps were not rotated between positions. A single count of flies captured in each trap was performed 24 hours after the final release. Approximately 5% of flies were not captured by any trap. The results are given in Table I.

TABLE I

| TRAP | MEAN TOTAL FLY COUNT | |
| --- | --- | --- |
| | Average | SD |
| FIG. 3 embodiment | 82.0 | 28.1 |
| Trap of Acevedo | 8.5 | 4.1 |

The nearly 10-fold increase in average fly catches clearly demonstrates the superior performance provided by the present invention. However, there was concern that a lack of rotation emphasized unforeseen positional effects, so the test was repeated with rotation of trap positions between repetitions.

EXAMPLE II

Prototypes of the embodiment depicted in FIG. 2 were compared to a commercially available trap of similar shape (Fly Motel® Window Trap, Black Flag Brands LLC, New York Mills, N.Y.; also known as the trap of Acevedo, U.S. Pat. No. 5,649,385) in a replicated cage bioassay. Two traps of each type were placed in a 25 cm wide×25 cm high×75 cm long acrylic box with a screen on one end. All traps were secured in a bottom corner of a long wall. Similar traps were placed in opposing corners to minimize possible positional effects due to minor variations in external light. Two replicate cages were set up. Approximately 40 flies (*Musca domestica*, Rincon-Vitova Insectaries, Ventura, Calif.), 1-2 days old and mixed sexes, were released into each cage every day for four days. The number of flies caught in each trap was counted daily before releasing the next set. Traps were rotated between positions daily to compensate for the positional effects observed previously. Approximately 12% of flies were not captured by any trap. The results are given in Table II.

TABLE II

| TRAP | FLIES PER DAY PER TRAP | |
| --- | --- | --- |
| | Average | SD |
| FIG. 2 embodiment | 12.4 | 12.4 |
| Trap of Acevedo | 5.8 | 5.4 |
| Uncaught | 4.8 | 5.9 |

The superior performance provided by the present invention is reinforced by the two-fold increase in average fly catches. High variance in the average fly counts of both traps was due to an uneven number of flies released across days, not due to variable performance. Even with high variance, the difference in average trap catches was statistically significant (p=0.048).

What is claimed is:
1. An insect trap comprising:
   a. a container with at least two, substantially parallel, opposing walls, wherein the at least two opposing walls are transparent;

b. a first light polarizing layer oriented at a first polarization angle and coupled to the first of the at least two opposing walls;

c. a second light polarizing layer oriented at a second polarization angle and coupled to the second of the at least two opposing walls;

d. wherein the first polarization angle and the second polarization angle are substantially 90 degrees offset from each other, such that light that is incident on the outside surface of the first of the at least two opposing walls enters into the interior of the container as polarized light of the first polarization angle, and that the polarized light of the first polarized angle which is incident on the inside surface of the second of the least two opposing walls is blocked from exiting the container;

e. at least one opening through which insects may enter said container; and f. an insect trapping means internal to said at least two opposing walls.

2. The insect trap of claim 1, wherein:

at least 80% of light incident on the outside surface of either the first or second of the at least two opposing walls enters the interior of the container as polarized light; and wherein no more than 10% of the light incident on the outside surface of either one of the at least two opposing walls is blocked from exiting the container.

3. The insect trap of claim 1, wherein said insect trapping means is a clear adhesive coupled to at least one of the container walls.

4. The insect trap of claim 3, wherein said adhesive includes a coloring agent.

5. The insect trap of claim 3, wherein said adhesive includes an ultraviolet-enhancing pigment.

6. The insect trap of claim 1, further comprising a securing means by which to secure the container to a substrate.

7. The insect trap of claim 6, wherein said securing means is a pressure-sensitive adhesive coupled to an outside surface of the container.

8. The insect trap of claim 6, wherein the securing means couples the container to a window.

9. The insect trap of claim 8, wherein said securing means couples one of the at least two opposing walls substantially flush to the face of said window.

10. The insect trap of claim 1, wherein said insect trapping material is suitable for trapping insects selected from the group consisting of: Asian ladybeetles, box elder bugs, brown marmorated stink bugs, cluster flies, cone bugs, filth flies, fruit flies, fungus gnats, house flies, June beetles, moths, yellow jackets.

11. The insect trap of claim 1, further comprising at least one marginal spacing element separating the at least two opposing walls, wherein said at least one spacing element creates at least one opening through which insects may enter.

12. The insect trap of claim 11:

wherein the container is composed of a sheet, and wherein the sheet includes an unfolded mode and a folded mode, wherein the sheet in the unfolded mode is flat, and the sheet in the folded mode is the container.

13. The insect trap of claim 12, wherein, in the folded mode, the sheet includes overlapping portions that interlock and maintain the folded mode.

14. The insect trap of claim 12, wherein said sheet further includes scored lines that substantially define the shape of the container in the folded mode.

15. The insect trap of claim 12:

wherein the first polarizing layer and the second polarizing layer are first and second portions of a single continuous polarizing layer that is coupled to the sheet, and wherein the first polarizing layer and the second polarizing layer are respectively oriented into the first polarization angle and the second polarization angle when the sheet is in the folded mode.

16. The insect trap of claim 1, further comprising at least one internal spacing element separating the at least two opposing walls, wherein said at least one spacing element creates at least one opening through which insects may enter.

17. The container of claim 1 wherein either said first polarized light plane or said second polarized light plane is horizontal.

18. The container of claim 1 further comprising a pheromone lure.

19. An insect trap comprising:

a. a container with at least two, substantially parallel, opposing walls, wherein the at least two opposing walls are transparent;

b. the first wall being comprised of a polarizing film and oriented at a first polarization angle;

c. the second wall being comprised of a polarizing film and oriented at a second polarization angle;

d. wherein the first polarization angle and the second polarization angle are substantially 90 degrees offset from each other, such that light that is incident on the outside surface of the first of the at least two opposing walls enters into the interior of the container as polarized light of the first polarization angle, and that the polarized light of the first polarized angle which is incident on the inside surface of the second of the least two opposing walls is blocked from exiting the container;

e. at least one opening through which insects may enter said container; and f. an insect trapping means internal to said at least two opposing walls.

* * * * *